United States Patent [19]
Dolezal

[11] 4,014,595
[45] Mar. 29, 1977

[54] DRILL BIT WITH SEAL RING COMPENSATOR
[75] Inventor: George Edward Dolezal, Laurel, Miss.
[73] Assignee: Hughes Tool Company, Houston, Tex.
[22] Filed: May 30, 1975
[21] Appl. No.: 582,492
[52] U.S. Cl. .................................. 308/8.2; 308/187
[51] Int. Cl.² ........................................ F16C 19/00
[58] Field of Search ............ 308/8.2, 187; 184/6.21
[56] References Cited
UNITED STATES PATENTS
3,721,306  3/1973  Sartor ............................. 308/8.2 X OTHER PUBLICATIONS
Production Control Units Product Bulletin, No. 105-A, 106-A published 12/28/66.

Primary Examiner—Robert R. Song
Assistant Examiner—Gene A. Church
Attorney, Agent, or Firm—Robert A. Felsman

[57] ABSTRACT

Disclosed herein is a drill bit for earth boring that achieves pressure compensation or equalization of pressure across the seal separating the lubricant inside the bit from the drilling mud on the exterior of the bit by providing sufficient displacement of the seal to accommodate changes in lubricant volume caused by temperature and pressure changes encountered in drilling. By minimizing the volume of lubricant in the system, seal displacement may be minimized to produce pressure equalization across the seal without need for additional pressure equalization. Therefore, the lubrication system may be simplified and its reliability increased.

8 Claims, 5 Drawing Figures

DRILL BIT WITH SEAL RING COMPENSATOR

BACKGROUND OF THE INVENTION

1. Field of the Invention

This invention relates in general to earth boring drill bits and in particular to improved means for their lubrication.

2. Description of the Prior Art

Earth boring drill bits commonly utilize bearing lubrication systems. The successful lubrication of drill bit bearings depends upon an effective seal such as that disclosed in U.S. Pat. No. 3,397,928 issued to Edward M. Galle. The lubrication system typically includes a compensator that equalizes the pressure differential across the seal, as described in U.S. Pats. Nos. 3,007,750 and 3,137,508 to Cunningham. Further, it is advantageous to include a pressure relief valve to limit the internal lubrication system pressure to a selected magnitude above the pressure in the well bore, as disclosed in U.S. Pat. No. 3,476,195 issued to Edward M. Galle.

Problems arise from the complexity of the lubrication system, which normally includes a seal, a flexible membrane compensator and a pressure relief valve. Should there be a malfunction of any component, the effectiveness of the lubrication system will be destroyed. Shortly thereafter, a bearing failure is experienced. A reduction in the number of components in the system is therefore advantageous.

SUMMARY OF THE INVENTION

It is therefore the general object of this invention to provide a drill bit having a simplified lubrication system that achieves pressure compensation of the lubricant with a reduced number of components. This object is accomplished in general by correlating the potential volume displacement of the seal means between cutter and shaft with the potential change in lubricant volume responsive to temperature and pressure changes to be encountered during drilling. The volume displacement of the seal means is minimized if the volume of the passages and spaces of the bearing system is minimized and filled with a lubricant essentially free of air and gas. Effective filling is achieved by evacuating air and gas from these passages and spaces prior to filling with lubricant. The potential volume displacement of the seal is greater than or equal to the volume change of the lubricant. This is accomplished in the preferred embodiment through utilization of a seal means such as a O-ring positioned in a groove of width sufficiently greater than the thickness of the O-ring to permit displacement along the groove responsive to the expected volume changes of the lubricant.

DESCRIPTION OF THE PREFERRED EMBODIMENT

In a copending application filed of even date herewith, Edward M. Galle discloses an invention entitled "Fully Lubricated Earth Boring Drill Bit" that utilizes vacuum filling and degassed lubricant to eliminate substantially all air and gas in the lubrication system of a drill bit to improve lubrication and minimize damage to the system components such as the compensator. In another copending application filed of even data herewith, Edward M. Galle and Leon B. Stinson disclose an invention enetitled "Drill Bit Utilizing Lubricant Thermal Expansion and Relief Valve For Pressure Control" involving recognition that it is possible to eliminate the compensator and use only a pressure relief valve and displacement of the seal between cutter and shaft for lubricant pressure control. The present invention utilizes a principle and structure which correlates potential changes in lubricant volume, responsive to temperature and pressure changes encountered during drilling, with the displacement of the seal means to control the pressure differential across the seal means. A successful drill bit is achieved with the present invention by minimizing the volume of the passages and spaces of the bearing containing the lubricant such that the change in volume of the lubricant, responsive to temperature and pressure changes encountered during drilling, is minimized. This minimizes the required displacement of the seal. In the preferred embodiment, the relationship between the width of the groove and the thickness and placement of the associated seal is such that seal displacement can accomplish the required pressure equalization or compensation.

Figure 1:
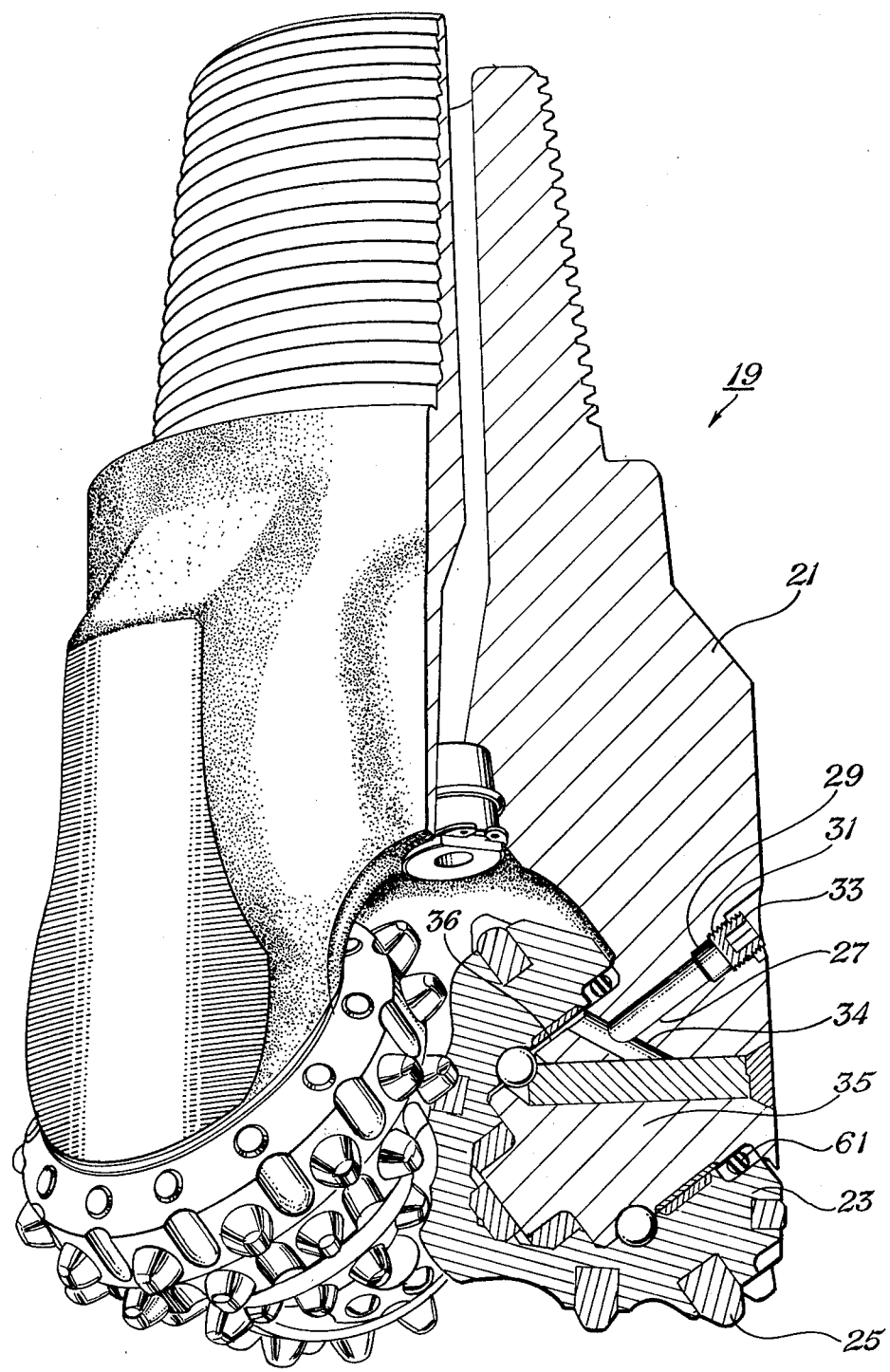
FIG. 1 is a perspective view, partially in section, of an earth boring drill bit having a lubrication system constructed in accordance with the principles of the invention.

The numeral 19 in FIG. 1 of the drawings designates a lubricated, rotatable cutter type earth boring drill bit having a body formed with three head sections 21, each supporting a rotatable cutter 23 having earth disintegrating teeth 25. A filler hole 27 has an enlarged upper region 29, threaded at 31 to receive a threaded plug 33. The filler hole intersects a passage 34 leading to a small flat 36 on shaft 35 to lubricate the bearing. The bearing is otherwise identical with that shown enlarged in FIG. 2.

Figure 2:
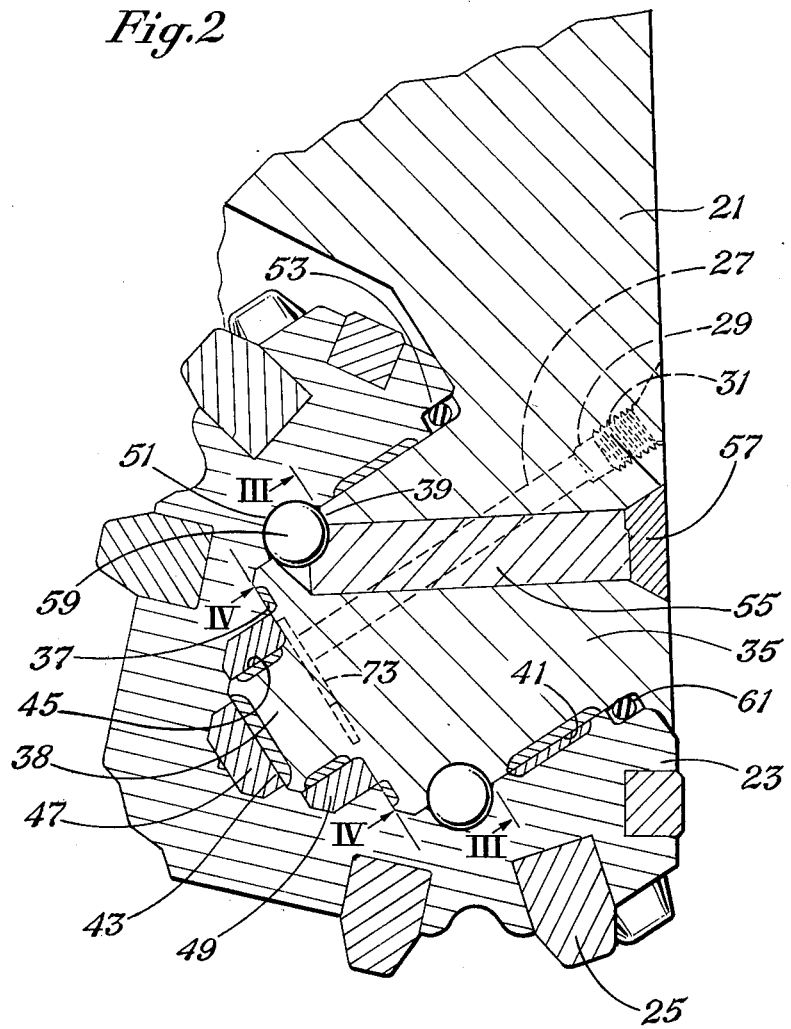
FIG. 2 is a longitudinal and fragmentary section of a portion of the drill bit having an alternate form of the invention.

A bearing shaft or pin 35 in FIG. 2 extends inwardly in cantilever fashion from each head section 21 and terminates with a pivot pin 38 which intersects a thrust face 37. A ball bearing raceway 39 is formed on the shaft, as is a friction bearing surface 41. The end 43 of the pilot pin may include a deposit of bearing material such as one of the cobalt based alloys, as may the surfaces 45 and 41.

The cutter 23 has a thrust button 47 to engage the end of the pilot pin, and a bushing 49 to engage the cylindrical surface 45. Cutter 23 also has a ball race 51 and a seal ring groove 53, generally L-shaped. A plug 55 is welded at 57 to the leg 21 to fill a mating hole through which the ball bearings 59 are fed to fill the matching raceways 39 and 51 to retain the cutter on the bearing shaft. The O-ring 61 is capable of a selected amount of displacement on the bearing shaft and in the L-shaped groove 53 of the cutter.

Figure 3:
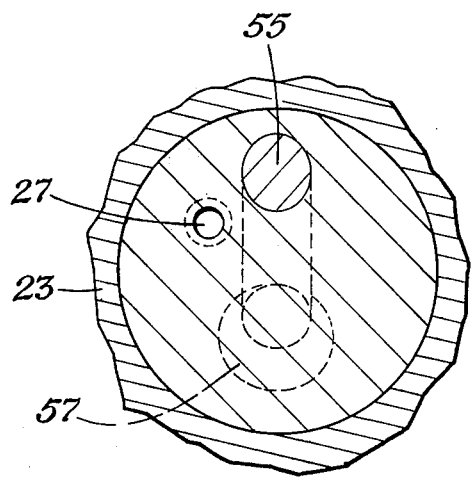
FIG. 3 is a fragmentary cross-sectional view as seen looking along the line III—III of FIG. 2.
Figure 4:
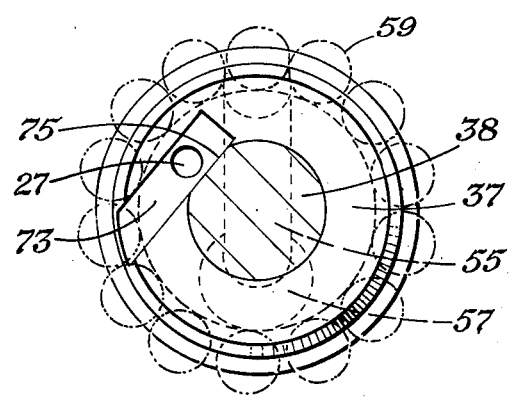
FIG. 4 is a cross-sectional view as seen looking along the line IV—IV of FIG. 2.

As seen in the cross-sectional views of FIG. 2, 3 and 4, the filler hole 27 extends to a slot 73 (see FIG. 4) formed in the thrust face 37 and across a portion of the pilot pin 38 to form a flat 75 thereon for the improved flow of lubricant.

Figure 5:
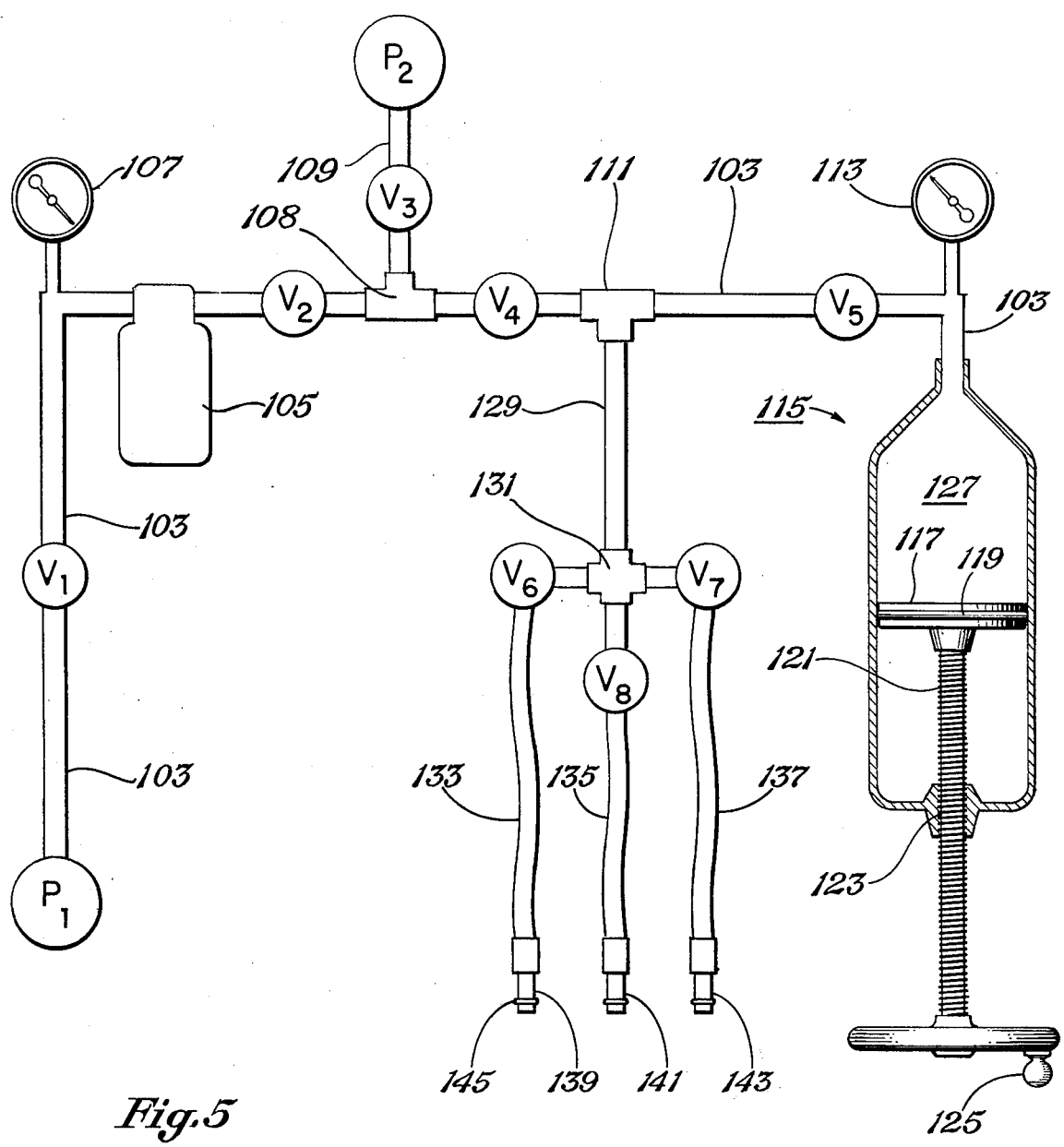
FIG. 5 is a schematic representation of apparatus used to lubricate the drill bit shown in FIG. 1.

The lubricant system shown is filled with a degassed lubricant by a method that eliminates essentially all air and gas in the system by means of the apparatus shown schematically in FIG. 5. A vacuum pump $P_1$ is connected by a pipe or conduit 103 and through a valve $V_1$ with a sump 105. A vacuum gage 107 is connected with conduit 103 between valve $V_1$ and the sump 105.

"T" connection 108 connects a valve $V_3$ and an air supply $P_2$ connected through conduit 109, with sump 105 and valve $V_2$ in conduit 103. Conduit 103 extends through "T" connection 108 to valve $V_4$ through another "T" connection 111 to valve $V_5$, pressure gage 113, and ultimately to a chamber 115. Chamber 115 contains a piston 117 sealed with an O-ring 119 against the interior side wall of the chamber. Screw 121 engages mating threads 123 in a lower region of the chamber and when rotated with handle 125, selectively enlarges or decreases a sealed volume 127 in the chamber.

From "T" connection 111 a conduit 129 leads to a manifold 131 connected to three separate conduits 133, 135 and 137 respectively through valves $V_6$, $V_8$ and $V_7$ to nipples 139, 141 and 143, each having a sealing O-ring 145.

The lubricant used to fill the bit should be substantially free of air and gas. This may be accomplished with the apparatus shown in FIG. 5 by opening valves $V_1$, $V_2$, $V_4$ and $V_5$ while closing valves $V_3$, $V_6$, $V_7$ and $V_8$. Pump $P_1$ is energized to effect a pressure substantially equal to zero absolute. The lubricant in sealed volume 127 of chamber 115 is subjected to this vacuum for a period of about 24 hours. This has been found sufficient to rid a lubricant with a viscosity of 1200 Seconds Saybolt Universal at 100° F. of substantially all air and gas.

The lubricating passages and spaces of the drill bit are also evacuated of air and gas, but not necessarily simultaneously with the degassing of the lubricant. Each nipple 139, 141 and 143 is connected to the enlarged region or recess 29 of each of the three filler holes 27 of a three cone bit. The O-rings 145 form a fluid tight seal between the nipples and the filler hole recess. The previously described passages and spaces are then evacuated by opening valves $V_6$, $V_7$ and $V_8$ to the vacuum pump $P_1$. Valve $V_5$ may remain open or may be closed and valves $V_1$, $V_2$ and $V_4$ remain open.

After both the lubricant and the passages and spaces are substantially free of air and gas, valve $V_1$ is closed and the system is checked for leaks by observing vacuum gage 107. If no gage variation is detected, valve $V_4$ is closed to block the lubricant, valve $V_5$ is opened and lubricant is forced into the passages and spaces of the drill bit by turning the screw handle 125 to move the piston 117 inwardly. The desired pressure, which for the disclosed viscosity is about 500 psi (pounds per square inch), will be indicated by gage 113.

After filling, valve $V_5$ is closed and the nipples 139, 141 and 143 are removed from the bit. If any appreciable amount of lubricant is expelled from the bit when nipples 139, 141 and 143 are removed, a quantity of gas or air is trapped in the bit. This indicates that either the lubricant was not properly degassed or that the passages and spaces were not properly evacuated.

To prepare for the next drill bit which must be evacuated prior to being filled with lubricant, the lubricant within conduits 129, 133, 135, 137 and conduit 103 between valve $V_4$ and "T" connection 111 must be removed. This is accomplished by opening valve $V_3$ to the air supply $P_2$, while closing valves $V_2$ and $V_5$ and two of the three valves $V_6$, $V_7$ and $V_8$. The air forces the remaining lubricant from the conduit associated with the open valve $V_6$, $V_7$ or $V_8$. Each conduit 133, 135 and 137 should be purged of lubricant in this manner.

When the conduits 129, 133, 135 and 137 have been purged, valve $V_3$ is closed and the nipples 139, 141 and 143 are connected to the filler holes of a second bit for evacuation and lubrication as previously described. Should any lubricant remain in the conduits and be drawn towards the vacuum pump, it will be collected in sump 105. If there is sufficient lubricant remaining in chamber 115 from the prior filling, the degassing of the lubricant may be eliminated. When necessary to replenish the lubricant, chamber 115 may be detached from conduit 103, piston 117 withdrawn to enlarge the sealed volume 127, and fresh lubricant introduced. The fresh lubricant should be degassed as previously discussed.

After lubricant has been introduced into the bit, with the apparatus and method described, a predetermined volume of lubricant is removed from the filler hole 27 and a retaining plug 33 is inserted into each enlarged region of each filler hole. The removal of the lubricant causes entrapment of a predetermined volume of air in the lubricant system after sealing with plug 33. When lowered into a bore hole, the trapped volume of air decreases rapidly with increasing hydrostatic pressure and moves the O-ring to an intermediate position in the groove.

In operation and during drilling with the bit of the preferred embodiment filled with the lubricant by the apparatus and method described, volumetric changes of the lubricant occurs due to geothermal temperature increase, temperature increase due to friction caused by rotation of the bit in the well bore, and hydrostatic pressure increase as the bit is lowered to bottom. The consequent volume changes of the lubricant displaces the O-ring 61 along the groove 53. It is therefore necessary to calculate the lubricant volume, consider its maximum possible volumetric change due to temperature and pressure changes during drilling, and then provide for sufficient O-ring volume displacement to be at least equal to, and preferably greater than, the volumetric change in the lubricant. Therefore the pressure drop across the O-ring is minimized and its effectiveness and life significantly improved. When the bit is raised from the bottom of a well bore, the temperature of the lubricant inside the bearing generally decreases, as does the hydrostatic pressure of the fluid in the well bore. The O-ring will be displaced along its groove to accommodate changes in lubricant volume.

It should be apparent from the foregoing that an invention having significant advantages has been provided. The invention eliminates the need for any type of compensation, except that provided by the volume displacement of the seal means and such as is provided by movement of the cutter on the bearing shaft. A completely lubricated drill bit is thus provided, with a minimum number of components, leading to greater reliability.

While the invention has been shown in only two of its forms, it should be apparent to those skilled in the art that it is not so limited, but is susceptible to various changes and modifications without departing from the spirit thereof.

What is claimed is:

1. In an earth boring drill bit having a rotatable cutter sealingly retained on mating surfaces of a bearing shaft, and a lubrication system, the improvement comprising:
   the lubrication system having passages and spaces filled with lubricant of predetermined potential change in volume responsive to temperature and pressure changes to be encountered during drilling;
   seal means between the rotatable cutter and bearing shaft capable of displacement responsive to volume change of the lubricant;
   the potential change in lubricant volume being correlated with the potential displacement of the seal means to provide sufficient displacement of the seal to limit the pressure differential across the seal means.

2. In an earth boring drill bit having a rotatable cutter sealingly retained on mating surfaces of a bearing shaft, and a lubrication system including passages and spaces in the bit, the improvement comprising:
   the passages and spaces being filled with lubricant essentially free of air and gas;
   the lubricant having a predetermined potential change in volume responsive to temperature and pressure changes to be encountered during drilling;
   seal means between the rotatable cutter and bearing shaft capable of displacement responsive to volume changes of the lubricant;
   the potential change in lubricant volume being correlated with the potential displacement of the seal means to provide sufficient displacement of the seal means to limit the pressure differential across the seal means.

3. In an earth boring drill bit having a rotatable cutter sealingly retained on mating surfaces of a bearing shaft, and a lubrication system including passages and spaces in the bit, the improvement comprising:
   the passages and spaces being evacuated of air and gas and filled with lubricant essentially free of air and gas;
   the lubricant having a predetermined potential change in volume responsive to temperature and pressure changes to be encountered during drilling;
   seal means between the rotatable cutter and bearing shaft capable of displacement responsive to volume changes of the lubricant;
   the potential change in lubricant volume being correlated with the potential displacement of the seal means to provide sufficient displacement of the seal means to limit the pressure differential across the seal means.

4. In an earth boring drill bit having a rotatable cutter sealingly retained on mating surfaces of a bearing shaft, and a lubrication system, the improvement comprising:
   the lubrication system having passages and spaces filled with lubricant having potential volume change responsive to temperature and pressure changes to be encountered during drilling;
   seal means between the rotatable cutter and bearing shaft to separate the lubricant from the fluid in the well bore and being capable of displacement responsive to lubricant volume changes;
   the potential change in lubricant volume being less than or equal to potential displacement of the seal means to substantially equalize the pressure across the seal means, without additional pressure equalization.

5. In an earth boring drill bit having a rotatable cutter sealingly retained on mating surfaces of a bearing shaft, and a lubrication system including passages and spaces in the bit, the improvement comprising:
   the passages and spaces being filled with lubricant essentially free of air and gas;
   the lubrication system having passages and spaces filled with lubricant having potential volume change responsive to temperature and pressure changes to be encountered during drilling;
   seal means between the rotatable cutter and bearing shaft to separate the lubricant from the fluid in the well bore and being capable of displacement responsive to lubricant volume changes;
   the potential change in lubricant volume being less than or equal to the potential displacement of the seal means to substantially equalize the pressure across the seal means, without additional pressure equalization.

6. In an earth boring drill bit having a rotatable cutter sealingly retained on mating surfaces of a bearing shaft, and a lubrication system including passages and spaces in the bit, the improvement comprising:
   the passages and spaces being evacuated of air and gas and filled with lubricant essentially free of air and gas;
   the lubrication system having passages and spaces filled with lubricant having potential volume change responsive to temperature and pressure changes to be encountered during drilling;
   seal means between the rotatable cutter and bearing shaft to separate the lubricant from the fluid in the well bore and being capable of displacement responsive to lubricant volume changes;
   the potential change in lubricant volume being less than or equal to the potential displacement of the seal means to substantially equalize the pressure differential across the seal means without additional pressure equalization.

7. In an earth boring drill bit having a rotatable cutter sealingly retained on mating surfaces of a bearing shaft, and a lubrication system including passages and spaces in the bit, the improvement comprising:
   the passages and spaces being evacuated of air and gas and filled with lubricant essentially free of air and gas;
   the lubrication system having passages and spaces filled with lubricant having potential volume change responsive to temperature and pressure changes to be encountered during drilling;
   an O-ring seal between the rotatable cutter and bearing shaft to separate the lubricant from the fluid in the well bore;
   the O-ring being positioned in a groove of width sufficiently greater than the thickness of the O-ring to permit displacement along the groove responsive to changes in lubricant volume;
   the potential change in lubricant volume being less than or equal to the potential displacement of the O-ring to substantially equalize the pressure differential across the O-ring without additional pressure equalization.

8. In an earth boring drill bit having a rotatable cutter retained on mating surfaces of a bearing shaft with an O-ring seal, and a lubrication system including passages and spaces in the bit, the improvement comprising:

the passages and spaces being evacuated of air and gas and filled with lubricant essentially free of air and gas;

the lubrication system having passages and spaces filled with lubricant having potential volume change responsive to temperature and pressure changes to be encountered during drilling, at least as great as the potential volume decreases reponsive to increasing hydrostatic pressure of the fluid in the well bore;

the O-ring being positioned in a groove of width sufficiently greater than the thickness of the O-ring to permit displacement along the groove responsive to changes in pressure differential across the O-ring;

the potential increase in lubricant volume being less than potential displacement of the O-ring to substantially equalize the pressure differential across the O-ring without additional pressure equalization except from cutter displacement on its shaft.

* * * * *

UNITED STATES PATENT OFFICE
CERTIFICATE OF CORRECTION

Patent No. 4,014,595   Dated March 29, 1977

Inventor(s) George Edward Dolezal

It is certified that error appears in the above-identified patent and that said Letters Patent are hereby corrected as shown below:

Column 2, line 50, "pivot" is changed to read ---pilot---.

Signed and Sealed this

Sixth Day of June 1978

[SEAL]

Attest:

RUTH C. MASON
Attesting Officer

DONALD W. BANNER
Commissioner of Patents and Trademarks